D. M. MEFFORD.
Corn Husker.
No. 28,884. Patented June 26, 1860.
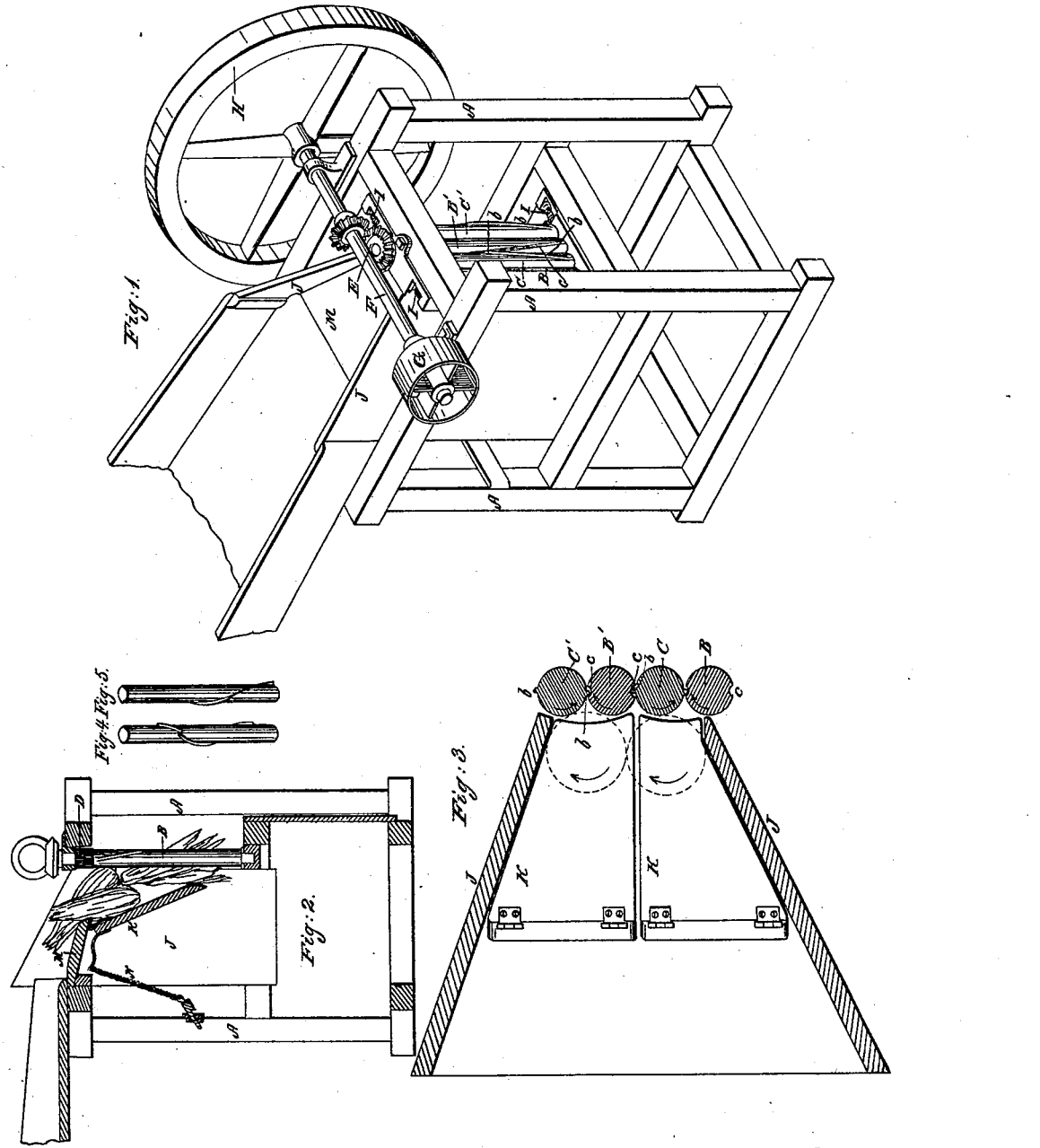
Witnesses:
James W. Gudey
John W. Clute
Inventor:
D m mefford
Knight Brothers attys

UNITED STATES PATENT OFFICE.

DAVID M. MEFFORD, OF JEFFERSONVILLE, INDIANA.

CORN-HUSKER.

Specification of Letters Patent No. 28,884, dated June 26, 1860.

*To all whom it may concern:*

Be it known that I, DAVID M. MEFFORD, of Jeffersonville, Clark county, Indiana, have invented certain new and useful Improvements in Corn-Huskers; and I hereby declare the following to be a full, clear, and exact description of the same, reference being had to the accompanying drawings, making part of this specification.

The present invention consists in certain improvements on the machine upon which Letters Patent were issued to me on the 22nd day of December, 1857, the object being a more efficient construction and arrangement of the rollers and their bearings.

In the acompanying drawings Figure 1 is a perspective view of a machine embodying the present improvements. Fig. 2 is a longitudinal section. Fig. 3 is a horizontal section. Figs. 4 and 5 represent modifications of the rollers.

A suitable frame A has journaled within it in a vertical or nearly vertical position one or more pairs of rollers B C, B' C', very long for their diameter which may be about that of an average sized ear of Indian corn.

F is a driving shaft rotated by a band pulley G or other suitable means and imparting motion to the rollers through the agency of gearing E.

The rollers of each pair are furnished with match pinions D which cause them to rotate in conjunction in the directions shown by arrows in Fig. 3. H represents a fly wheel. One roller of each pair is armed with one or more beads or tongues $b$ of about $\frac{3}{16}$ of an inch projection which mesh into corresponding grooves $c$ in the periphery of its fellow roller. The said beads and grooves $b$ $c$ are applied to the peripheries of the rollers either longitudinally of said rollers or in a slightly spiral manner so as to mesh first near the upper end of the rollers and act continuously upon the ear during its descent. The rollers have such diameter and the beads such prominence and proximity as to adapt them to effectually grip the shuck without shelling or injuring the corn.

$b'$ represents a portion of one of the beads cut into a series of teeth or serrations in order to incise and separate the husk to enable the beads to act upon it more speedily.

To permit the shanks of the ears and varying thicknesses of husk to pass between the rollers, one roller of each pair is allowed to yield about an eighth of an inch and is pressed forcibly toward its fellow by springs I behind its bearings.

J, J, are two flaring boards forming the sides, and K K are yielding flaps forming the back of a flume or funnel which acts to present the ears and press them against the rollers. The upper edges of the flaps are hinged to the hopper M or stationary portion of the flume, the lower edges being pressed toward the rollers by an adjustable spring N or its equivalent.

The continuous rotation of the ear in one direction so as to present all parts of its circumference to the action of the rollers is produced either by setting the flume slightly on one side of a central position in respect to the rollers so as to present the ear more fully to the action of a particular roller of each pair; or by confining the beads to one roller of each pair; or (as exhibited in the present illustration) by means of both these provisions combined. In the first named case both rollers of each pair may be beaded if preferred.

The beads and grooves on said rollers may be entire and may be more than one on each roller as represented in Figs. 1, 2, and 3; or they may be single on each roller and may be in broken sections as shown in Figs. 5 and 4 respectively.

The rollers may be vertical as represented or may be more or less inclined so that they afford the necessary descent to the ears.

For a hand machine I use a single pair of rollers operated by a crank.

Operation: The parts being set in motion and the flume being supplied with ears, the rollers act to grip between them the adjacent portions of the shucks at the same time imparting a rotary motion to the ear, so as to grip successive portions of the shuck and thus completely strip the ear before its exit at the bottom of the flume.

I do not restrict myself to the use of teeth in the beads and I do not claim rollers formed with teeth arranged latitudinally so that a series of teeth follow in the same path.

What I claim as new and of my invention as an improvement in corn huskers is—

1. The combination of spiral beads and grooves on vertical or inclined rollers adapted in the manner set forth to act continuously during the descent of the ear, substantially as described.

2. The use of teeth or serrations in the beads substantially in the manner and for the purpose set forth.

In testimony of which invention, I hereunto set my hand.

DAVID M. MEFFORD.

Witnesses:
GEO. H. KNIGHT,
OCTAVIUS KNIGHT.

UNITED STATES PATENT OFFICE
CERTIFICATE OF CORRECTION

PATENT NO. : 28,884
DATED : June 29, 1976
INVENTOR(S) : Walter Q. Jack and Loyd V. Johnson It is certified that error appears in the above-identified patent and that said Letters Patent are hereby corrected as shown below:

Column 9, line 17, "total phase" should read ---two phase---.
Column 11, line 3, "650" should read ---6.50---; line 46, "slurry" should read ---slurry,---; line 48, "dioxide," should read ---dioxide.---.

Signed and Sealed this

Twenty-second Day of February 1977

[SEAL]

Attest:

RUTH C. MASON
Attesting Officer

C. MARSHALL DANN
Commissioner of Patents and Trademarks